(12) United States Patent
Siudak et al.

(10) Patent No.: US 11,938,869 B2
(45) Date of Patent: Mar. 26, 2024

(54) WINDSCREEN

(71) Applicant: Pilkington Group Limited, Nr. Ormskirk (GB)

(72) Inventors: Tomasz Siudak, Sandomierz (PL); Lukasz Pawelec, Sandomierz (PL)

(73) Assignee: PILKINGTON GROUP LIMITED, Lancashire (GB)

( * ) Notice: Subject to any disclaimer, the term of this patent is extended or adjusted under 35 U.S.C. 154(b) by 421 days.

(21) Appl. No.: 17/282,049

(22) PCT Filed: Oct. 2, 2019

(86) PCT No.: PCT/GB2019/052782
§ 371 (c)(1),
(2) Date: Apr. 1, 2021

(87) PCT Pub. No.: WO2020/070494
PCT Pub. Date: Apr. 9, 2020

(65) Prior Publication Data
US 2021/0387578 A1    Dec. 16, 2021

(30) Foreign Application Priority Data
Oct. 2, 2018    (GB) ..................................... 1816070

(51) Int. Cl.
*B60R 11/02*    (2006.01)
*B60J 1/02*    (2006.01)
(Continued)

(52) U.S. Cl.
CPC .................. *B60R 11/04* (2013.01); *B60J 1/02* (2013.01); *B60J 1/20* (2013.01); *B60R 2011/0026* (2013.01)

(58) Field of Classification Search
CPC .... B60R 11/04; B60R 2011/0026; B60J 1/02; B60J 1/20
See application file for complete search history.

(56) References Cited

U.S. PATENT DOCUMENTS

| 9,487,156 B2 | 11/2016 | Frenzel et al. |
| 9,862,332 B2 | 1/2018 | Okuda |

(Continued)

FOREIGN PATENT DOCUMENTS

| DE | 10 2011 121 003 A1 | 6/2013 |
| DE | 10 2012 101 781 A1 | 9/2013 |

(Continued)

OTHER PUBLICATIONS

Great Britain Search Report dated Mar. 12, 2019, issued in corresponding Great Britain Patent Application No. GB1816070.5. (26 pages).

(Continued)

*Primary Examiner* — Amy J. Sterling
(74) *Attorney, Agent, or Firm* — BUCHANAN INGERSOLL & ROONEY PC

(57) ABSTRACT

A vehicle windscreen has a bracket attached for a sensor including a camera, the bracket comprising a baseplate and a retaining element. The sensor is housed in a housing inserted in the bracket, and at least one rod-shaped member projects from the housing, by way of which it is removably retained in the bracket. A first retaining element variant comprises a raised bed integrated with the baseplate, and a resilient opposed limb, joined to the bed at one end and free at the other end. The limb opposes the bed, and an elongate space extends between the two, with the space closed at one end and open at the other end so the rod-shaped member may enter/be retained in the space. Another retaining element variant comprises a bore having a conical portion and a cylindrical portion in communication with each other, and aligned along a common axis of rotation.

20 Claims, 6 Drawing Sheets

(51) Int. Cl.
　　　B60J 1/20　　　(2006.01)
　　　B60R 11/04　　(2006.01)
　　　B60R 11/00　　(2006.01)

(56) References Cited

U.S. PATENT DOCUMENTS

| | | |
|---|---|---|
| 2010/0065707 A1 | 3/2010 | Hansel |
| 2011/0233248 A1 | 9/2011 | Flemming et al. |
| 2015/0041510 A1* | 2/2015 | Frenzel .................. B60R 11/02 224/482 |
| 2015/0109447 A1 | 4/2015 | Okuda |
| 2016/0307953 A1* | 10/2016 | Kono .................... B60R 11/04 |
| 2017/0217382 A1 | 8/2017 | Gunes |
| 2017/0240120 A1* | 8/2017 | Krug ..................... F16M 13/02 |
| 2019/0193649 A1 | 6/2019 | Kataishi et al. |

FOREIGN PATENT DOCUMENTS

| | | |
|---|---|---|
| DE | 102013005801 A1 | 10/2014 |
| DE | 10 2014 012 001 A1 | 2/2016 |
| EP | 2965949 A1 | 1/2016 |
| EP | 2819885 B1 | 5/2016 |
| WO | 2016/023621 A1 | 2/2016 |
| WO | 2018055905 A1 | 3/2018 |

OTHER PUBLICATIONS

Great Britain Search Report dated Sep. 20, 2019, issued in corresponding Great Britain Patent Application No. GB1816070.5. (2 pages).
International Search Report (PCT/ISA/210) and Written Opinion (PCT/ISA/237) dated Nov. 15, 2019, by the European Patent Office as the International Searching Authority for International Application No. PCT/GB2019/052782.

* cited by examiner

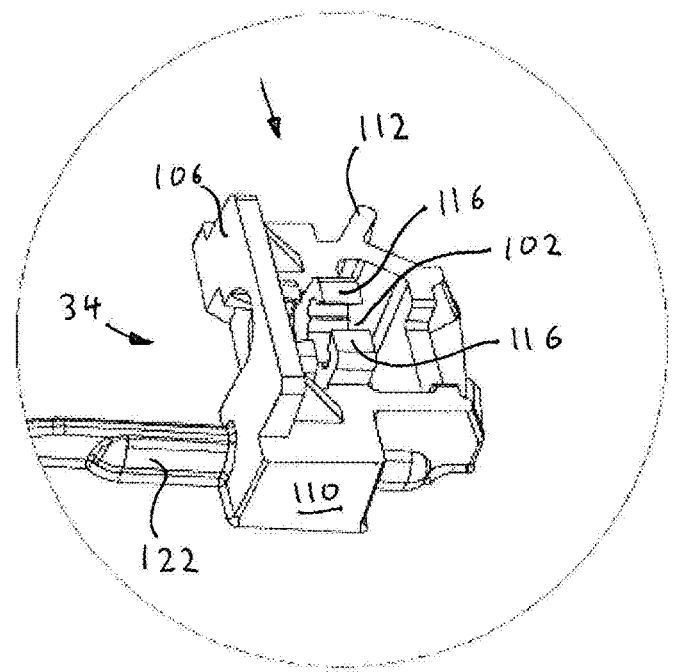
Fig 11
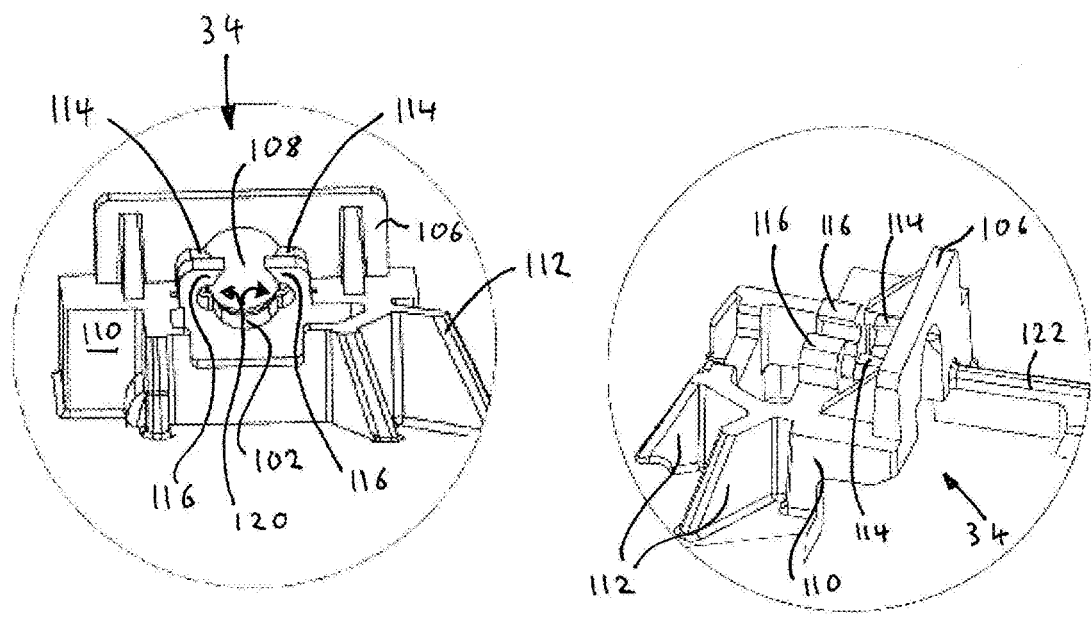
Fig 12
Fig 13

B-B

C-C

D-D

E-E

WINDSCREEN

The present invention relates to a windscreen, such as a windscreen for a vehicle, and in particular, to a windscreen having a bracket attached to it. The bracket may be for a sensor, including a camera. The invention also relates to the bracket itself, and in particular, to an arrangement for retaining the sensor or camera within the bracket.

In recent years, the fitting of sensors to vehicles has become more widespread. Moisture sensors are fitted to control the functioning of windscreen wipers, and light sensors are fitted to control the switching on and off of lighting systems, e.g. the vehicle's headlights and tail lights, according to ambient light levels. An increasing number of vehicles are now fitted with Advanced Driver Assistance Systems (ADAS), e.g. autonomous emergency braking, lane departure warning systems, adaptive cruise control and high beam assist, amongst others. Many of these systems employ one or more imaging sensors in the form of cameras mounted on the vehicle windscreen to provide images of the area ahead of the vehicle; these images are processed to yield data on which ADAS depend.

A preferred method of mounting cameras and sensors on the windscreen is by means of a suitable bracket, which is bonded to the windscreen. Brackets may be manufactured in metal or plastic, and may accommodate several sensors and cameras. The bracket may also be integrated with the mounting for an interior rear-view mirror. The correct functioning of ADAS is important for the safety of a vehicle and its occupants, and it is therefore also important that the camera or cameras on which ADAS depend is mounted accurately and securely. The bracket has an important role to play in achieving this.

Unfortunately, the windscreen of a vehicle may be damaged in service and need to be replaced. To reduce the costs associated with replacing a windscreen, it is normal practice to redeploy the cameras and sensors by transferring them to the new windscreen and recalibrating ADAS. Therefore cameras and sensors need to be retained within the bracket in a manner which allows them to be easily removed and replaced. It is also extremely important that cameras are positioned accurately every time that they are replaced in a bracket after removal, i.e. that the camera positioning is reproducible.

A variety of different retention systems has been proposed for retaining cameras and sensors within a bracket. Each new retention system attempts to satisfy the above requirements better, while naturally seeking to minimise cost. The latter requirement tends to favour simple designs over excessively complicated ones.

U.S. Pat. No. 9,487,156 discloses a holding frame, i.e. a bracket, for receiving and holding a sensor device, which may be a camera. The bracket has guideways to receive and guide holding elements of the sensor device, and devices such as guide ramps to produce a force on the sensor device in a direction along the guideways. The bracket may also include additional devices in the form of spring elements for mechanically fixing the sensor device in the bracket.

U.S. Pat. No. 9,862,332 discloses an in-vehicle camera having a camera body with projections and bosses by means of which the camera body is hooked on a hook portion of a bracket attached to a windscreen. A leaf spring also presses the camera body against the bracket.

US 2017/240120 discloses a carrier device, i.e. a bracket, for attachment to a vehicle window. The carrier device has a base plate which is secured to the window, on which base plate a carrier arrangement is formed to hold a housing of at least one camera. The carrier arrangement includes at least one holding element having at least one spring element which is designed to apply pressure to a rod-shaped component which is arranged on the camera housing.

The use of metal springs in a plastic bracket adds to the cost and complexity of the bracket. Not only must the springs be fabricated separately from the bracket, but a separate assembly step is then required, in which the springs are inserted into the bracket. Retention of the springs themselves within the bracket may be a problem, necessitating the taking of additional measures to prevent the springs becoming dislodged.

DE 10 2013 005 801 discloses a plastic bracket for fastening to a vehicle window, and having a support arrangement designed to retain at least one camera housing without the use of metal springs. The support arrangement includes at least one, preferably three, plastic clip elements designed to cooperate with rod-shaped components arranged on the camera housing. However, the camera housing is not retained sufficiently securely by the clips alone, and so in a further embodiment, the support arrangement is augmented by securing elements. Unfortunately these securing elements require a step to be machined into the ends of the rod-shaped components, and this adds to the cost of the camera housing.

It would therefore be desirable to provide a bracket for a sensor (including a camera), suitable for attaching to a windscreen, which is able to meet the required standards of accuracy, security, and reproducibility of positioning and retention of the camera in a cost-effective manner, yet without employing metal springs or other measures which add to the cost and complexity of the arrangement.

According to a first aspect of the invention, a windscreen for a vehicle is provided, the windscreen comprising a bracket for a sensor including a camera, the bracket being attached to the windscreen and comprising a baseplate and at least one retaining element mounted on the baseplate, wherein the sensor is accommodated within a sensor housing which may be inserted (i.e. is insertable) in the bracket, the sensor housing has at least one rod-shaped member projecting from the sensor housing by means of which the sensor housing may be retained in the bracket in a removable manner, the retaining element comprises a raised bed integrated with the baseplate, the retaining element additionally comprises a resilient opposed limb, which is joined to the raised bed at one end and is free at the other end, the resilient opposed limb is positioned in generally opposed relationship to the raised bed, with an elongate space extending between the resilient opposed limb and the raised bed, the elongate space is closed at one end by the join between the raised bed and the resilient opposed limb, and is open at the other end so that the rod-shaped member may enter the elongate space when the sensor housing is inserted into the bracket and be retained therein.

The rod-shaped member may have a generally cylindrical shape. In that case, the cross-section of the rod-shaped member is circular. Alternatively or additionally, the cross-section of the rod-shaped member may be partially or near-circular, elliptical, polygonal or irregular. If polygonal, the rod-shaped member may be generally triangular, quadrilateral e.g. square, rectangular or trapezoidal, pentagonal, hexagonal, heptagonal, octagonal, etc, in its cross-sectional shape. When the rod-shaped member is irregular in cross-sectional shape, its shape may be a combination of two or more of the above shapes, e.g. part-circular with one or more flat sides.

The use of an integrated raised bed as part of the retaining element is advantageous, because as a result of the integration of the raised bed into the baseplate the retaining element may be designed with a reduced elevation relative to the baseplate of the bracket compared with alternative designs. This feature enables a squat, stable design to be used, which confers enhanced stability on the retaining element, as well as the desired accuracy, security, and reproducibility of positioning and retention of the sensor. Integration of the raised bed with the baseplate means that only the resilient opposed limb needs to deflect to allow the rod-shaped element to enter the elongate space, which also adds to the stability of the retaining element.

The bracket may be made of plastic, and may be manufactured by injection moulding or 3D printing. Any of the plastics commonly used to manufacture automotive components by these processes may be employed for the bracket.

The resilient opposed limb owes its resilience to the inherent flexibility of the material, e.g. plastic, of which it is made, together with its shape, which is generally elongate. The thickness, variation in thickness (e.g. a taper) and other aspects of the shape described below may be altered to provide the degree of stiffness required to retain the rod-shaped member securely. In this way, the sensor housing may be retained securely within the bracket without the need for metal springs.

In practice, it is common for the sensor to be a camera, so the sensor housing corresponds to the housing of the camera.

In a windscreen according to the invention, it is desirable that the bracket is adapted to receive the sensor housing. More particularly, it is desirable that the at least one retaining element in the bracket is adapted to receive the at least one rod-shaped member provided on the sensor housing. For example, the elongate space within the retaining element preferably widens towards its open end to form a guideway for the rod-shaped member. Preferably, the guideway guides the rod-shaped member into the elongate space when the sensor housing is inserted into the bracket. More preferably, the shape of the guideway is partly defined by the shape of the raised bed and partly by the shape of the free end of the opposed limb.

The provision of a guideway for the rod-shaped member assists in aligning the sensor housing with the retaining elements in the bracket, thereby facilitating easier insertion of the sensor housing into the bracket.

The retaining element is desirably further adapted in that the raised bed comprises a recess to receive part of the at least one rod-shaped member, and the resilient opposed limb also comprises a recess to receive another part of the at least one rod-shaped member. The resilient opposed limb is preferably arranged so that the recess provided in the opposed limb is opposite the recess provided in the raised bed, so that the two recesses define together a space to receive the rod-shaped member (the "receiving space") within the elongate space.

Preferably the recesses in the raised bed and the resilient opposed limb match or at least resemble the shape of the rod-shaped members which are provided on the sensor housing. This allows the rod-shaped member, and therefore the sensor housing, to be retained more securely. For example, if the rod-shaped members are generally cylindrical, the recesses are preferably also cylindrical, or at least partially cylindrical, or near-cylindrical. Clearly, if the rod-shaped member is generally of cylindrical configuration, it is advantageous to provide a corresponding cylindrical space to receive the rod-shaped member.

Although both the raised bed and the opposed limb preferably comprise a cylindrical recess, in other respects they are not mirror images of each other, so they are asymmetric. This asymmetry results in particular from the integration of the raised bed into the baseplate of the bracket.

Preferably, the receiving space which receives the rod-shaped member is in communication with adjacent spaces which are part of the elongate space, so that when the sensor housing is inserted in the bracket, the at least one rod-shaped member may pass from the guideway through part of the elongate space and be received in the receiving space thereby retaining the sensor housing in the bracket.

The receiving space which receives the rod-shaped member is normally the part of the elongate space where the greatest separation occurs between the resilient opposed limb and the raised bed. Consequently, during entry of the rod-shaped member into the guideway, the rod-shaped member comes into contact with the surfaces of the opposed limb and guideway, resulting in the exertion of a force upon them. This in turn results in the deflection (i.e. elastic deformation) of the opposed limb away from the raised bed, allowing the rod-shaped member to pass between the opposed limb and the raised bed, through part of the elongate space, and into the receiving space. Once the rod-shaped member has come to rest in that space, the opposed limb returns as far as possible towards its rest position.

Preferably, the dimensions of the receiving space are slightly less than those of the rod-shaped member, so that the rod-shaped member is held tightly between the resilient opposed limb and the raised bed, with the resilient opposed limb slightly stressed.

If the rod-shaped member and the receiving space are generally cylindrical, then preferably, the diameter of the cylindrical receiving space is slightly less than the diameter of the rod-shaped member, so that the opposed limb and raised bed exert a clamping force on the rod-shaped member, ensuring that it is retained securely. This may mean that in practice the cylindrical receiving space is not a perfect cylinder, but is generally slightly flattened, i.e. slightly elliptical in cross-section.

For even greater security, it is preferable that the raised bed additionally comprises a resilient raised tab projecting towards the closed end of the elongate space at an acute angle to the raised bed, whereby the resilient raised tab is also elastically deformed by the rod-shaped member as it enters the elongate space, the resilient raised tab offering greater resistance to removal of the rod-shaped member than to entry thereof. Depending on the angle, length and thickness of the tab, its resistance to removal of the rod-shaped member may be adjusted to the requisite level for any combination of bracket and sensor (camera).

Furthermore, the clamping force on the rod-shaped member, and the ease or difficulty with which the camera may be installed or removed (in terms of the magnitude of the force exerted), may be adjusted by adjusting the dimensions of the retaining element. For example, increasing the length of the elongate space tends to reduce the force exerted. In particular, lengthening the distance from the receiving space for the rod-shaped member to the join of the resilient opposed limb to the raised bed reduces the clamping force, providing that the thickness of the resilient opposed limb remains unchanged.

Preferably the width of the retaining element is greater than the maximum distance between the resilient opposed limb and the raised bed. As mentioned above, the maximum distance between the opposed limb and the raised bed normally occurs in the cylindrical space, the maximum distance being equivalent to the diameter of the cylindrical space. Stipulating that the retaining element should be wider than this distance ensures that the retaining element possesses a desirably high level of strength and stability, which in turn ensures that the sensor housing is held securely within the bracket.

As also mentioned above, the resilient opposed limb is deflected by the rod-shaped member as the latter enters the elongate space between the opposed limb and the raised bed. This deflection causes stress in the retaining element, particularly in the region where the opposed limb and raised bed meet, i.e. at the closed end of the elongate space. It is therefore desirable to design the retaining element in a manner which reduces this stress. Preferably, the surfaces of the opposed limb and the raised bed which define the elongate space at its closed end, where the opposed limb and the raised bed meet, possess a minimum radius of curvature of 0.5 mm, thereby avoiding the closed end acting as a stress concentrator when the opposed limb is caused to deflect or flex. More preferably, the minimum radius of curvature is 0.75 mm, or still more preferably, 1 mm or 1.25 mm.

Typically, a sensor housing is provided with at least one, often two, and preferably three rod-shaped members, which may have different shapes. When more than one rod-shaped member is present, each one is preferably provided on a different side of the sensor housing. For instance, a rectangular sensor housing may have at least one rod-shaped member which extends from the housing in a direction perpendicular to the direction of insertion of the housing into the bracket, and at least one rod-shaped member which extends from the housing in a direction parallel to the direction of insertion of the housing into the bracket. Thus the first type of rod-shaped member moves perpendicular to its axis during insertion, whereas the second type moves parallel to, or along, its axis during insertion.

According to the direction in which the rod-shaped element extends and moves, differing designs of retaining element may be desirable.

According to a second aspect, the invention provides a windscreen for a vehicle, the windscreen comprising a bracket for a sensor including a camera, the bracket being attached to the windscreen and comprising a baseplate and at least one retaining element mounted on the baseplate, wherein the sensor is accommodated within a sensor housing which may be inserted in the bracket, the sensor housing has at least one rod-shaped member projecting from the sensor housing by means of which the sensor housing may be retained in the bracket in a removable manner, the at least one retaining element is adapted to receive the at least one rod-shaped member, and the at least one retaining element comprises a bore having a conical portion and a cylindrical portion in communication with each other, and aligned along a common axis of rotation.

At least one end of the bore is open to receive the rod-shaped member, and the other end may be open or closed. The bore may also be open along one side, in which case it is more in the nature of a channel.

This design of retaining element is particularly suitable for a rod-shaped member which extends parallel to the direction of insertion of the sensor housing into the bracket and moves along its own axis during insertion. By way of comparison, the retaining element according to the first aspect of the invention is particularly suitable for a rod-shaped member which extends perpendicular to the direction of insertion of the sensor housing into the bracket, while remaining parallel to the baseplate. During insertion of the rod-shaped member into the bracket according to the second aspect, the tip of the rod-shaped member enters the conical portion of the bore or channel first, and then the cylindrical portion. Optionally, the diameter of the cylindrical portion is the same as the diameter of the rod-shaped member, in order to retain the latter securely.

The conical and cylindrical portions of the bore each comprise a surface of rotation which together define the space occupied by the bore. When the bore is open along one side, the conical and cylindrical portions are not complete, i.e. their surfaces of rotation do not describe a complete revolution of 360°. This facilitates manufacture of the retaining element together with the bracket in a single injection moulding operation. Bearing in mind the inherent resilience of the plastic from which the bracket is made, it also means that the diameter of the cylindrical portion may be slightly less than the diameter of the rod-shaped member, so that the rod-shaped member is a tight fit in the cylindrical portion, and pressure is exerted on the rod-shaped member, thereby ensuring that the rod-shaped member is held captive in the cylindrical portion. The sensor housing is therefore retained even more securely.

In the case of the conical portion of the bore, the surface of rotation extends in an axial direction between a first end and a second end of the conical portion. The ends of the conical portion are circular, but are not normally complete circles, because as previously stated the surface of rotation may not describe a complete revolution. Preferably, the first end has a smaller diameter whereas the second end has a larger diameter, and the end with the smaller diameter is closer to the cylindrical portion than the end with the larger diameter. It is also desirable that the end with the larger diameter is open, and serves as a guideway to guide the at least one rod-shaped member into the cylindrical portion when the sensor housing is inserted in the bracket. It is further desirable that the diameter of the first, smaller end should be similar to, or slightly larger than, that of the cylindrical portion. Again, this is to ensure that the rod-shaped member may be guided into the cylindrical portion smoothly and without hesitation.

As previously mentioned, the surfaces of the conical and cylindrical portions of the bore need not form a complete 360° surface of rotation, and one consequence of this is that either or both of the conical portion and the cylindrical portion may be open along their curved sides, parallel to their axes of rotation. However, it is desirable that the surface of each of the conical and cylindrical portions describes a rotation through at least 180°, since this ensures that the rod-shaped member cannot pass through the open side without deforming (preferably elastically) the retaining element. In this way, the rod-shaped member is retained securely in the retaining element.

Preferably, the open end of the conical portion of the bore terminates in an aperture in a further surface in the retaining element. The further surface may be a wall, plate, face, etc. The aperture is aligned with, and is preferably coaxial with, the conical and cylindrical portions of the bore in the retaining element, and assists with the entry of the rod-shaped member into the retaining element. Once the tip of the rod-shaped element has passed through the aperture, it is loosely constrained by the walls of the aperture, which prevent the rod-shaped member from departing from the intended trajectory. The aperture also offers a clearly visible target to aim for, when inserting the sensor housing into the bracket, thereby facilitating quick and reliable insertion of the sensor housing into the bracket. In its preferred form, the aperture has an axis of rotational symmetry, and the aperture is coaxial with the conical portion and the cylindrical portion. Preferably at least the tip of the one rod-shaped member passes through the aperture when the sensor housing is inserted in the bracket. It is also desirable that the dimensions of the aperture should be slightly larger than those of the rod-shaped member, so that the latter is a loose fit in the former. The wall within which the aperture is defined may also act as a reinforcing member for the retaining element.

Optionally, the conical portion and the cylindrical portion of the bore are separated from each other by a slot oriented at right angles to their common axis of rotation. This may assist with manufacture of the bracket by injection moulding. A further consequence is that the bore is then in two co-axial parts.

Further optionally, a retaining element according to the second aspect of the invention may include a raised bed, possibly in the form of a plinth.

A bracket provided with retaining elements as described above is particularly suitable for receiving a sensor housing which is inserted into the bracket in a direction substantially parallel to the baseplate of the bracket. When the bracket is in position on a windscreen, it is preferable if the direction of insertion includes a downwards component, since this means that insertion of the sensor housing is assisted by gravity, and also that gravity helps retain the sensor housing in the retaining elements. Insertion of the sensor housing in a direction parallel to the baseplate, and thereby also parallel to the windscreen, also means that removal of the sensor housing may then be carried out in a more controlled manner. This results in less likelihood of the bracket inadvertently becoming detached from the windscreen, or of damage being caused to the windscreen as the result of an excessive force being applied to the inner ply of the windscreen.

Given the rake angle of the typical windscreen, insertion of the sensor housing into the bracket preferably involves movement of the sensor housing in a direction towards the front of the vehicle as well as downwards. In the event of an emergency stop or a frontal collision, this direction of insertion is advantageous because the forces on the sensor housing will push it further into the retaining elements, rather than pull it out of the retaining elements. The latter situation would risk the camera becoming dislodged in a situation in which it may be controlling the braking function of the vehicle, which would of course be totally unacceptable.

Preferably the bracket is made wholly of plastic. This avoids the additional costs and complication which result from the use of additional materials, such as metal. As with the first aspect of the invention, it is advantageous that the bracket design avoids the need for metal springs.

Preferably, the bracket is manufactured in a single injection moulding operation. Alternatively, it may be manufactured by 3D printing.

The invention also relates to a bracket for attachment to a vehicle windscreen, wherein the bracket is adapted to receive a sensor including a camera, and the bracket includes any of the features described above, or any combination thereof.

The invention further relates to the combination of a vehicle windscreen having a bracket for a sensor attached to the windscreen, and a sensor inserted in the bracket, i.e. with the sensor in place in the bracket.

According to a third aspect, the invention provides a windscreen for a vehicle, the windscreen comprising a bracket for a sensor including a camera, the bracket being attached to the windscreen and comprising a baseplate and at least one retaining element mounted on the baseplate, wherein the sensor is accommodated within a sensor housing which may be inserted in the bracket, the sensor housing has at least one rod-shaped member projecting from the sensor housing by means of which the sensor housing may be retained in the bracket in a removable manner, the at least one retaining element is adapted to receive the at least one rod-shaped member, the retaining element comprises a raised bed integrated with the baseplate, the retaining element additionally comprises an opposed limb, which is joined to the raised bed at one end and is free at the other end, the opposed limb is positioned in generally opposed relationship with the raised bed, with an elongate space extending between the opposed limb and the raised bed, the elongate space is closed at one end by the join between the raised bed and the opposed limb, but is open at the other end and widens towards the open end to form a guideway, the raised bed and the free end of the opposed limb are shaped so as to define the widening of the open end of the elongate space to form the guideway, the guideway serves to guide the at least one rod-shaped member into the elongate space when the sensor housing is inserted in the bracket, the raised bed comprises a cylindrical recess to receive part of the at least one rod-shaped member, the opposed limb also comprises a cylindrical recess to receive another part of the at least one rod-shaped member, the opposed limb is further arranged so that the cylindrical recess provided in the opposed limb is opposite the cylindrical recess provided in the raised bed, so that the two cylindrical recesses define together an approximately cylindrical space within the elongate space, the cylindrical space is in communication with adjacent spaces which are part of the elongate space, so that when the sensor housing is inserted in the bracket, the at least one rod-shaped member may pass from the guideway through part of the elongate space and be received in the cylindrical space thereby retaining the sensor housing in the bracket.

The invention will now be further described and illustrated by means of the following non-limiting specific embodiments with reference to the accompanying drawings in which:

FIGS. 11 to 13 are perspective views of the retaining element of FIGS. 8 to 10;

Figure 1:
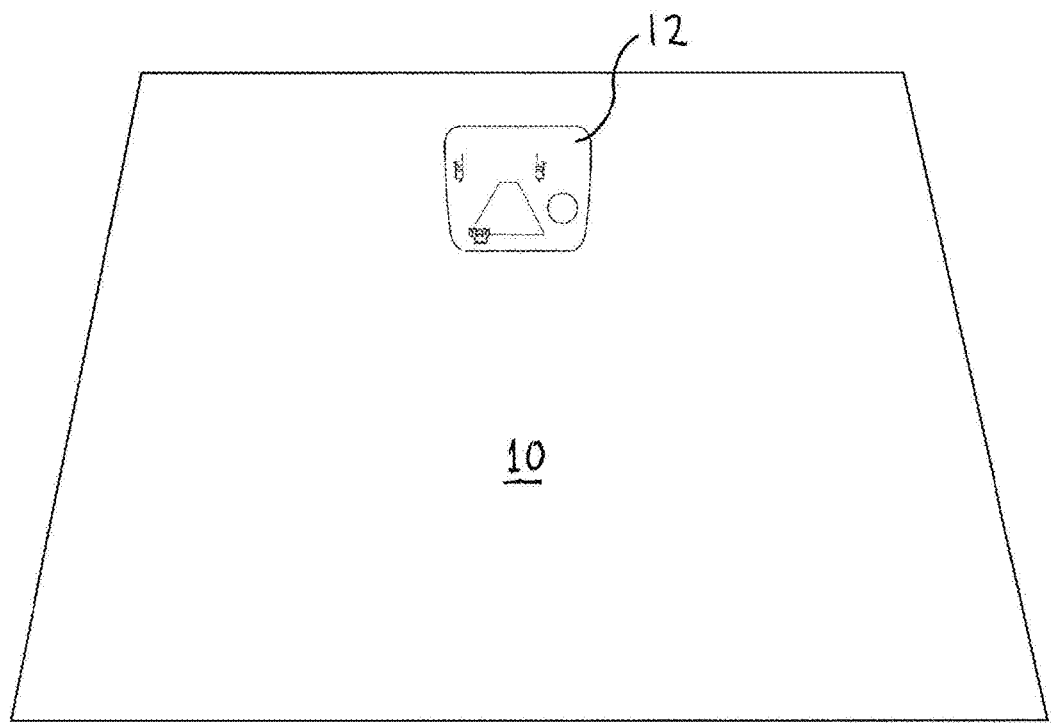
FIG. 1 is a plan view of a windscreen for a vehicle with a bracket attached.

With reference to FIG. 1, a windscreen 10 for a vehicle is shown, to which is attached a bracket 12. The bracket provides a means of mounting a camera, and other sensors such as rain or light sensors, onto the windscreen. This provides the sensors with a view forwards, while protecting the sensors from adverse environmental influences such as the weather, in particular moisture, dirt and damage. In this position the sensors are able to monitor an area in front of the vehicle; in the case of a camera, the area may be a considerable distance in front of the vehicle. Rain and light sensors monitor the amounts of rain and light respectively that are incident upon the windscreen.

Typically, the windscreen is generally trapezoidal, with symmetry about is centreline, and the bracket is positioned on the centreline of the windscreen and towards its upper edge. However, the bracket may be positioned elsewhere on the windscreen. The bracket may be generally rectangular, trapezoidal or an irregular shape. Nevertheless, the bracket usually has mirror symmetry with regard to at least its outline, and for aesthetic reasons the bracket generally has rounded corners.

It is preferable for the bracket to be positioned within the area of the windscreen which is wiped by the windscreen wipers, in order to maintain the cleanliness of the part of the windscreen through which the camera views the area in front of the vehicle, so that the camera's view is not obscured by dirt.

The bracket is made wholly of plastic, and is bonded by a suitable adhesive to the side (i.e. one of the major faces) of the windscreen which faces the interior of the vehicle. Typically, the bracket is injection moulded in a thermoplastic material, and bonded to the windscreen by a polyurethane adhesive.

FIG. 1 depicts the windscreen viewed from the inside of the vehicle, i.e. the figure shows the side which faces the vehicle interior when the windscreen is in situ in the vehicle.

Figure 2:
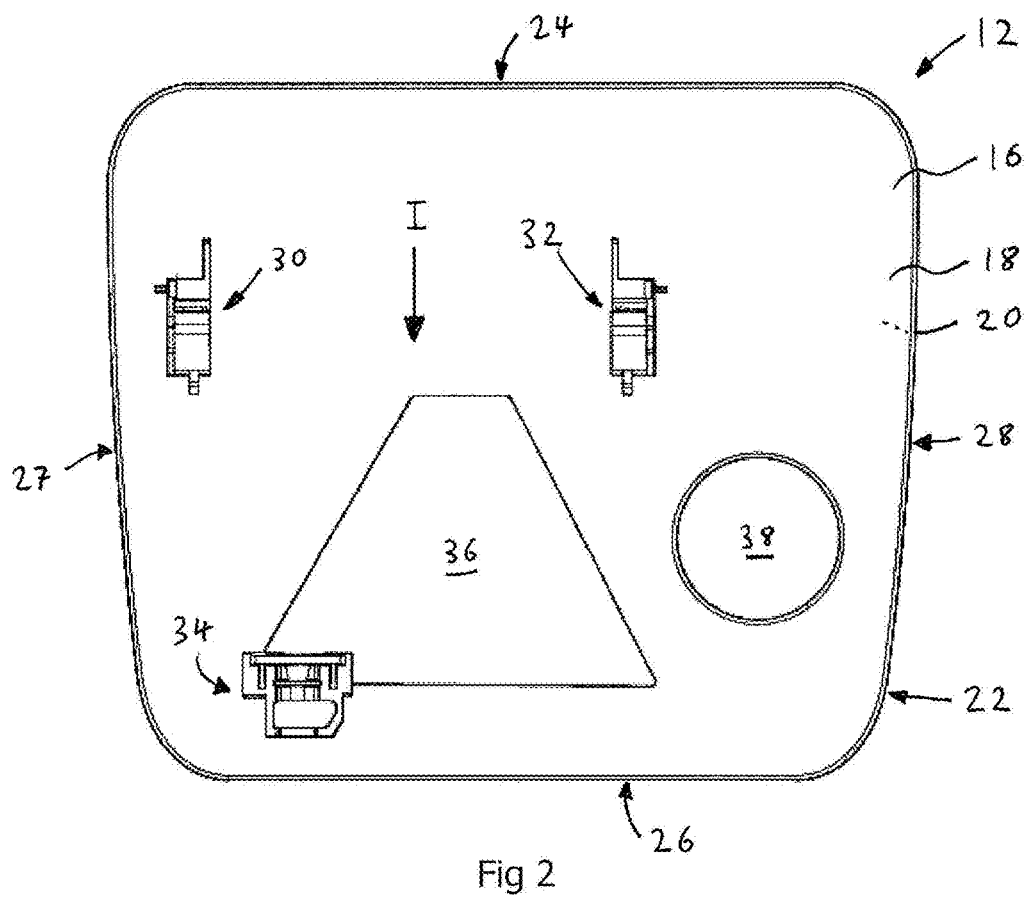
FIG. 2 is a plan view of the bracket of FIG. 1, greatly enlarged.

FIG. 2 is a plan view of the bracket 12, which is greatly enlarged in comparison with FIG. 1 in order to illustrate the details of the bracket more clearly. The direction of view in FIG. 2 is the same as in FIG. 1. The bracket 12 comprises a baseplate 16 having two major faces 18, 20 and a periphery 22. Furthermore, the baseplate 16 has long edges 24 and 26, and short edges 27 and 28. When the windscreen 10 is mounted in situ in a vehicle, the major face 18 of the baseplate 16 of the bracket 12 faces into the interior of the vehicle, and the major face 20 faces the windscreen. It is therefore major face 20 which is bonded to the windscreen. Long edge 24 forms the upper edge of the bracket, and long edge 26 forms the lower edge of the bracket. Short edge 27 form the left-hand edge of the bracket, when viewed in the direction of forwards travel of the vehicle, and short edge 28 forms the right-hand edge of the bracket.

It should be noted that this arrangement of long and short edges only applies to the particular type of bracket illustrated; it is also possible that, for example, the short edges form the upper and lower edges of the bracket, or that all the edges are approximately the same length.

Mounted on the baseplate 16 are three retaining elements 30, 32, 34 for retaining a camera. There are two upper retaining elements 30, 32 which are mirror images of each other, and represent a first variant of retaining element. The third or lower retaining element 34, which is positioned towards the lower edge 26 of the bracket, represents a second variant of retaining element. For brevity, the retaining elements will henceforth simply be referred to as "retainers".

The baseplate 16 is perforated by a number of apertures. A generally trapezoidal aperture 36 is provided through which the camera views the area in front of the vehicle. To the right of aperture 36 is a circular aperture 38 intended for a rain or light sensor. Larger and more complex brackets are possible; for instance there may be two trapezoidal apertures 36 arranged in tandem to accommodate a stereo camera. Further apertures may also be provided for additional sensors.

The direction of insertion of a housing for a sensor or camera into the bracket is shown by arrow I. As previously described, the direction of insertion is substantially parallel to the baseplate, and in a downward direction on the drawing. Owing to the rake angle of the windscreen when installed in a vehicle, the camera is inserted into the bracket in a downwards and forwards direction when the windscreen is in situ in a vehicle.

In use the bracket 12 is covered by a cover (not shown) both for reasons of aesthetics and to protect the components mounted on the bracket.

Figure 3:
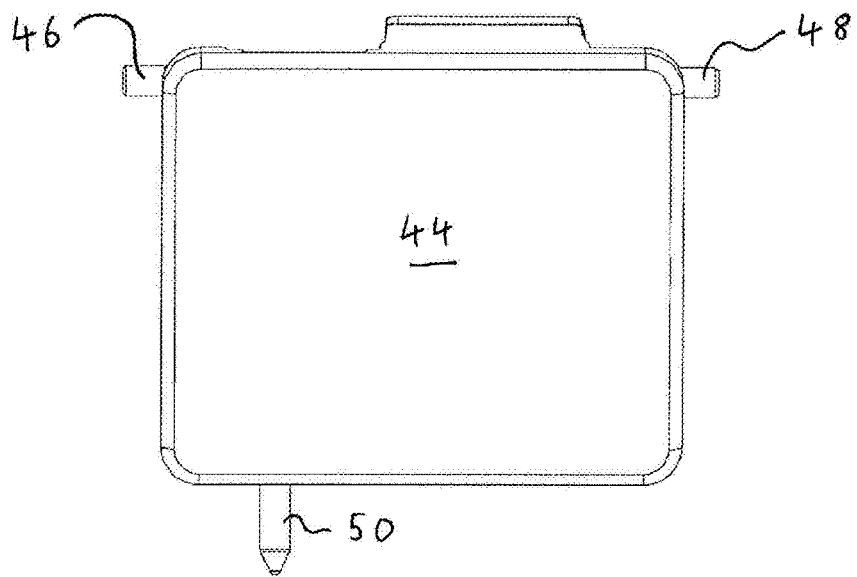
FIG. 3 is a plan view of a sensor housing, the sensor being a camera.

FIG. 3 shows a camera housing 44 for a camera. The camera housing is viewed in the same direction as FIGS. 1 and 2, i.e. from the inside of the vehicle. The camera lens is positioned on the side of the housing which faces the windscreen, so that the direction of view of the lens is forwards and through the windscreen. Consequently the camera lens is not visible in FIG. 3.

The camera housing 44 is provided with three rod-shaped members 46, 48 and 50, which protrude from the camera housing in different directions, and which will simply be referred to as "rods" for brevity. When the camera housing is inserted into the bracket 12, upper left rod 46 enters into and is retained by retainer 30, upper right rod 48 enters into and is retained by retainer 32, and lower rod 50 enters into and is retained by retainer 34. The rods are preferably cylindrical in shape, or at least have a portion that is approximately circular in cross-section, even if other portions are not cylindrical. For instance, the lower rod 50 may be provided with a conical tip to facilitate entry into lower retainer 34. As mentioned earlier, it is possible that the rods have cross-sectional shapes which are other than circular.

Figure 4:
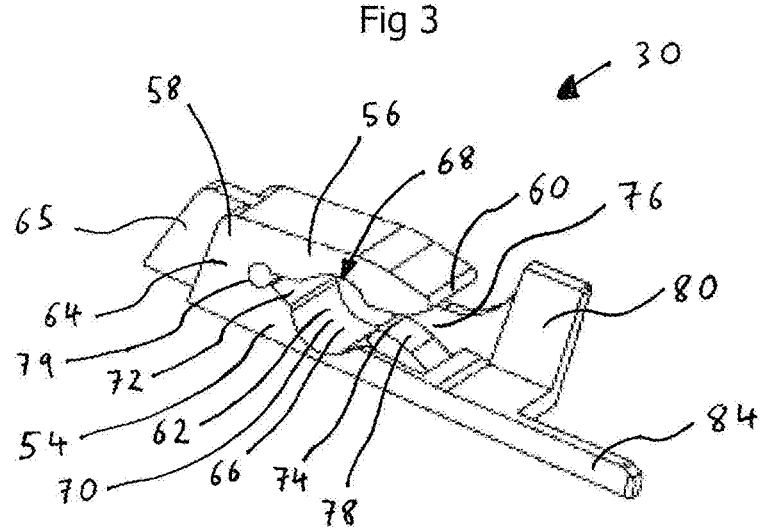
FIGS. 4 to 6 are perspective views of a first variant of a retaining element forming part of the bracket.
Figure 5:
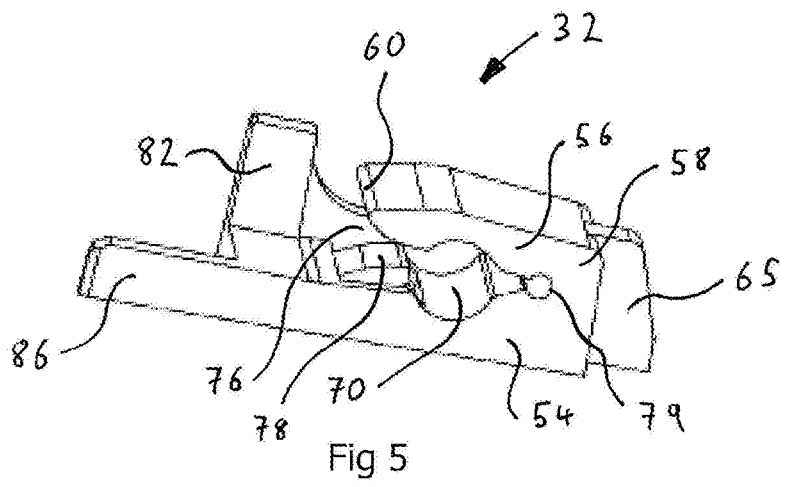
Figure 6:
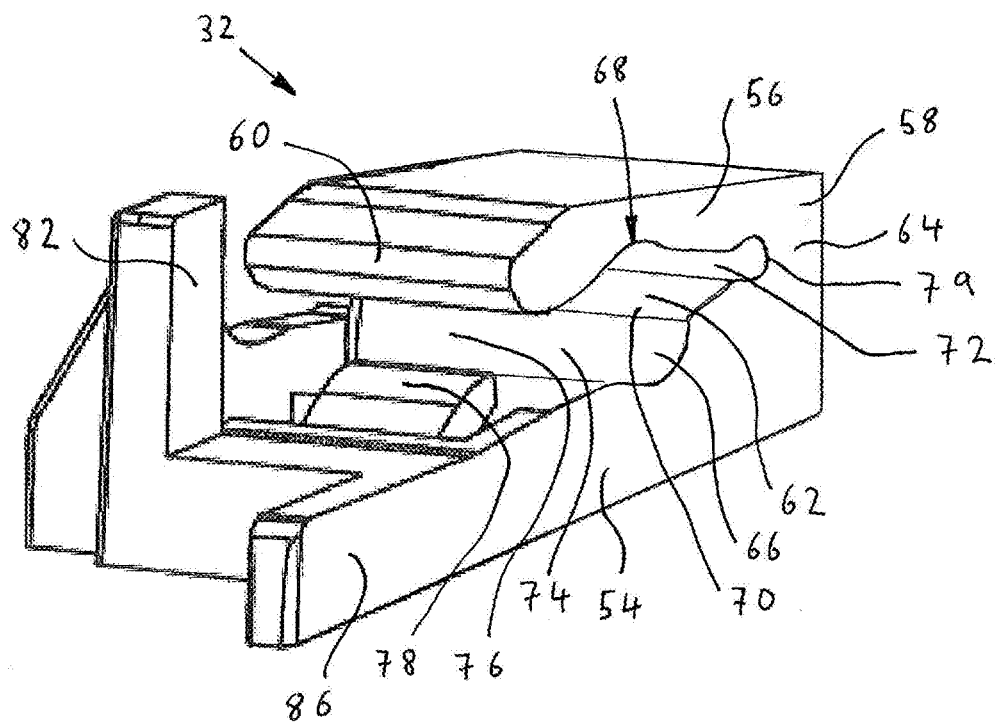

FIG. 4 is a perspective view of the upper left retainer 30, whereas FIGS. 5 and 6 are perspective views of the upper right retainer 32. The upper right retainer 32 is a mirror image of the upper left retainer 30, and so the following description applies equally to FIGS. 4, 5 and 6, mutatis mutandis. Most of the reference numerals have been omitted from FIGS. 5 and 6 to allow a clearer view of the retainer, unimpeded by an excess of leading lines.

Each retainer 30, 32 comprises a raised bed 54 which is integrated with the baseplate 16. A resilient opposed limb 56 is joined to the raised bed 54 at a first end 58, and is free at its other or second end 60. The opposed limb 56 is positioned in generally opposed spaced relationship to the raised bed 54, so that an elongate space 62 is defined between the opposed limb and the raised bed. The elongate space 62 extends between the opposed limb and the raised bed from the free end 60 of the opposed limb to the join 64 of the opposed limb 56 to the raised bed 54. The elongate space 62 is closed at its first end by the join 64 between the raised bed 54 and the opposed limb 56, and is open at its other, second, end adjacent the free end 60 of the opposed limb. Optionally, a reinforcing rib 65 may be provided to reinforce and stabilise the retainer 30, 32 in the vicinity of the join 64.

The raised bed 54 comprises an upward-facing (as seen in the drawing) recess 66 of approximately cylindrical shape, i.e. forming part of a cylinder. A corresponding downward-facing recess 68 is provided in the opposed limb 56. Together the two cylindrical recesses define an approximately cylindrical space 70, which receives rod 46 which protrudes from the camera housing 44. As may be seen in FIG. 4, the cylindrical space 70 is within the elongate space 62 and forms part of it. There are further spaces 72, 74 adjacent the cylindrical space 70, one on either side of the cylindrical space, which make up the remainder of the elongate space 62. These adjacent spaces are in communication with the cylindrical space 70.

The shape of the free end 60 of the opposed limb together with the shape of the corresponding opposed part of the raised bed together define a guideway 76 for the rod 46, the guideway representing a widening of the open end of the elongate space 62. When the camera housing 44 is inserted into the bracket 12, the guideway 76 receives the rod 46 and guides it into the elongate space 62. As the housing 44 is inserted further into the bracket 12, the rod 46 enters the cylindrical space 70, and comes to rest in that space 70.

If the dimensions of the cylindrical space 70 and the rod 46 are suitable and appropriate, and if the resilience (i.e. the restoring force caused by elastic deformation) of the opposed limb 56 is also appropriate, then the restoring force exerted on the rod 46 may be sufficient for it to be retained securely within the retainer 30, 32 without further measures. However, for extra security, a resilient raised retaining tab 78 may be provided as part of the raised bed 54. The tab 78 projects towards the closed end of the elongate space 62, i.e. towards the join 64 of the opposed limb 56 to the raised bed 54, and also towards the cylindrical space 70. The tab projects from the raised bed at an acute angle, and this angle thereby helps define the widening of the guideway 76 towards the open end of the elongate space 62. The raised tab 78 may, but need not, occupy the full width of the raised bed 54. To allow the tab to deform in a resilient manner, there is a space below it, and this space may perforate the baseplate, which facilitates injection moulding of the tab.

When the opposed limb 56 is elastically deformed or flexed, stresses are generated within the retainer 30, 32, and the closed end of the elongate space 62 may, depending on its shape, act as a stress concentrator at the join 64 of the opposed limb to the raised bed, leading to an increased risk of cracking or fracture of the plastic in the vicinity of the join. To minimise this risk, a minimum radius of curvature is observed for the surface 79 of the closed end, i.e. the surface defining the elongate space in the vicinity of the join. Preferably a minimum radius of curvature of 0.5 mm, more preferably 0.75 mm, is adopted for this surface 79, which may be in the form of part of a cylinder. Alternatively, to reduce the risk of stress concentration still further, a larger radius of curvature of 1 mm, or 1.25 mm, may be adopted, depending on the magnitude of the clamping force envisaged. In practice, this often means that the retaining element has a second, smaller, cylindrical space, as may be seen in FIGS. 4 to 7.

A wall 80, 82 of varying height may be provided alongside each retainer 30, 32 to control the lateral positioning of the rods 46, 48 during insertion of the camera housing 44 into the bracket 12, i.e. help guide the rods towards the guideways 76. The wall 80 is therefore placed on the left-hand side of the left-hand retainer 30, and the wall 82 is placed on the right-hand side of the right-hand retainer 32. The walls 80, 82 are highest in the vicinity of the guideways 76, where the lateral positioning of the rods 46, 48 is first established during insertion. Once the camera is in place, the walls constrain the rods laterally, and thereby contribute to the lateral stability of the camera, together with the lower retainer 34.

A ramp 84, 86 may be provided in front of the open end of each retainer 30, 32, again to help guide the rods 46, 48 towards the guideways 76, but this time in a vertical direction. Should the rods 46, 48 rest directly on the baseplate 16 as the camera housing approaches the retainers, the ramps 84, 86 serve to raise the rods sufficiently so that they are aligned with the raised beds 54.

Figure 7:
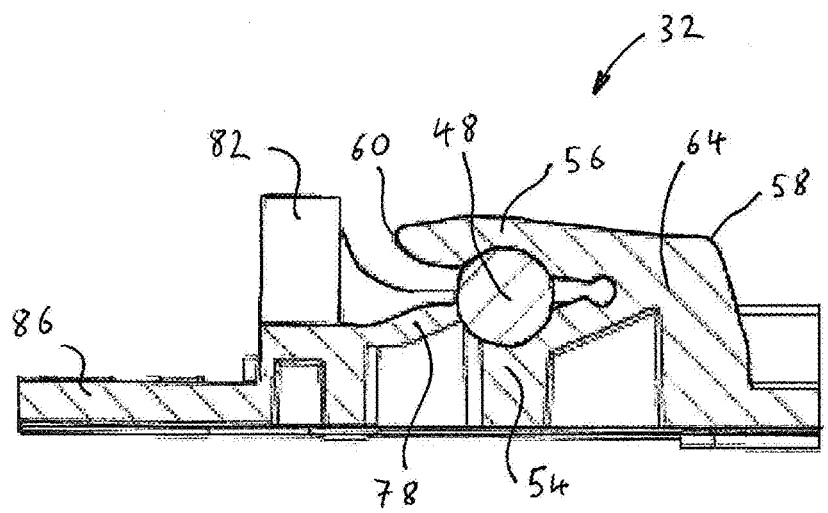
FIG. 7 is a side elevation, partly in section, of the retaining element of FIGS. 4 to 6, together with part of the sensor housing of FIG. 3, also in section.

FIG. 7 is a side elevation view, partly in section, of right-hand retainer 32, which additionally includes rod 48, i.e. part of the sensor housing 44, in sectional view. The rod 48 is in its final, latched position in the cylindrical space 70, and is held there, securely but removably, by the combined effects of raised tab 78, opposed limb 56 and raised bed 54, without the need for metal springs. The cross-section of rod 48 is circular.

When the camera housing 44 is inserted into the bracket 12, rods 46 and 48 move in a direction at right angle to their axes, and the tips of the rods are guided towards the guideways 76 of the retainers 30, 32 by the ramps 84, 86. The rods 46, 48 pass between the walls 80, 82 which align the rods with the retainers in a lateral direction. Next, the tips of the rods enter the guideways, and engage with the mutually opposed facing surfaces of the raised tabs 78 and resilient opposed limbs 56. The tabs and opposed limbs are deflected, i.e. elastically deformed, being forced apart by the rods to allow the rods to pass into the cylindrical receiving spaces 70. As the rods 46, 48 come to rest in the cylindrical receiving spaces 70, the opposed limbs 56 return towards their rest positions by virtue of their resilience. The precise degree to which the opposed limbs are restored to their original positions depends on the relationship of the diameters of the rods to the diameters of the cylindrical receiving spaces.

For secure retention of the rods 46, 48, and thereby the housing 44, it is desirable that the resilient opposed limbs 56 exert a clamping force on the rods, which results from the restoring force caused by the resilience of the opposed limbs. It is therefore desirable that the diameters of the rods 46, 48 should be slightly greater than the diameters of the corresponding cylindrical spaces 70. When the camera housing 44 is in its final position in the bracket 12, the rods are located in the cylindrical spaces in the retainers, retained there by the clamping forces exerted by the opposed limbs.

The retainers 30, 32 may be in the region of 10 to 30 mm long, 5 to 15 mm wide, and 4 to 12 mm high. The width of the retainer is preferably greater than its height. The diameter of the rods is typically in the range from 3 to 8 mm; many camera housings have rods which are around 5 mm in diameter.

Figure 8:
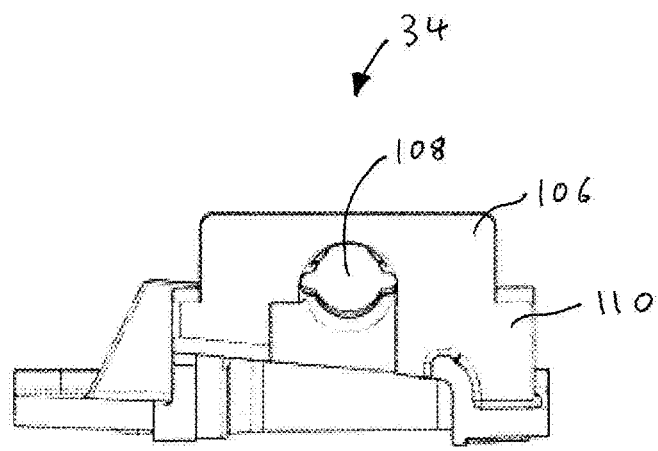
FIG. 8 is an end elevation of a second variant of a retaining element forming part of the bracket.
Figure 9:
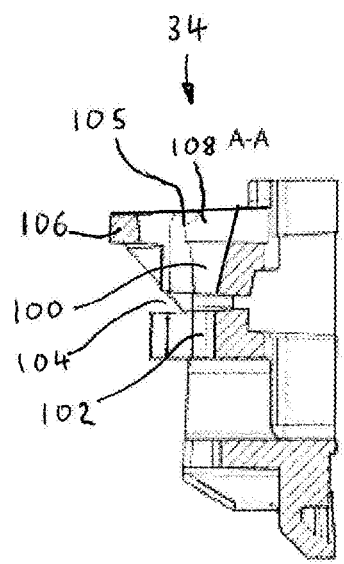
FIG. 9 is a side elevation, partly in section, of the retaining element of FIG. 8, the section being taken on line A-A shown in FIG. 10.
Figure 10:
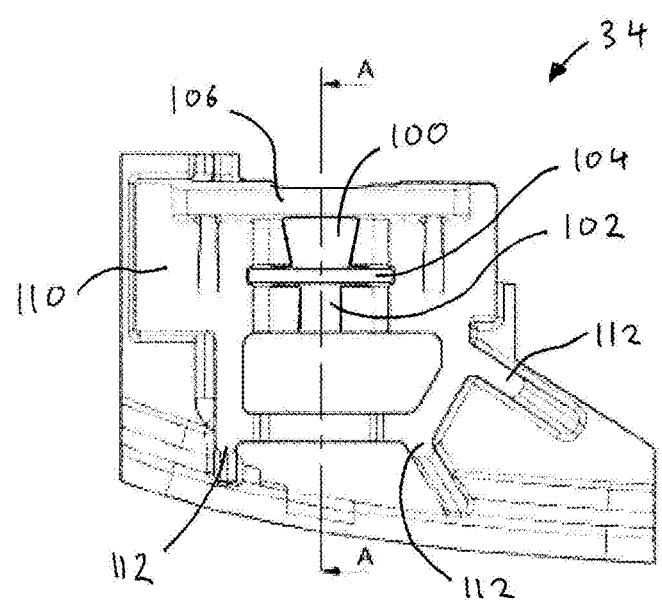
FIG. 10 is a plan view of the retaining element of FIGS. 8 and 9, showing the line of section A-A for FIG. 9.

FIGS. 8 to 18 relate to the second variant of retaining element 34, and FIGS. 8 to 10 are related to each other as end elevation, plan view and side elevation. FIG. 8 is an end elevation, showing the retaining element viewed from the top of the bracket 12 in a downward direction, i.e. in the same direction as the direction of insertion of the camera housing 44. FIG. 9 is a side elevation, partly in section, of the second variant of retaining element, the section being taken on line A-A in FIG. 10, which is a plan view of the retaining element. The orientation of FIG. 9 with regard to FIG. 10 is according to the rules of first-angle projection. Consequently, in FIG. 9, the upwards direction is to the left.

FIG. 10 shows the second variant of retaining element 34, comprising a bore having a conical portion 100 and a cylindrical portion 102 in communication with each other, the two portions being coaxially aligned. As it happens, the line of section A-A includes the common axis of rotation of the two portions. The conical portion 100 tapers in a downward direction, i.e. towards the cylindrical portion 102, which is in communication with the conical portion via an optional slot 104. Alternatively, the slot 104 may be omitted, in which case the conical portion is joined directly to the cylindrical portion, in the manner of a funnel. The end of the conical portion 100 having a larger diameter is open, and acts as a guideway 105 to receive the rod 50 and guide it towards and into the cylindrical portion 102. The descriptions of "conical" and "cylindrical" are convenient but only approximate, and slight deviations from these theoretical shapes are possible. For instance, in practice, the cylindrical portion may not be a perfect cylinder, owing to the need to provide a draft angle for reasons of injection moulding technology.

A wall 106 is optionally provided at the front of the retainer, i.e. at the side at which the rod 50 enters the retainer. An aperture 108 is provided in the wall 106, the aperture being aligned and in communication with the guideway 105 and the conical section 100. Rod 50 passes through the aperture 108 as it enters the retainer during insertion of the camera housing 44 into the bracket 12.

In order to support the retainer at the appropriate height above the baseplate 16, a raised bed in the form of an optional plinth 110 may be provided. The plinth 110 may be buttressed by optional ribs 112.

FIGS. 11 to 13 are perspective views of the second variant of retainer 34, in which certain elements may be seen more clearly than in the plan and elevation views of FIGS. 8 to 10. For instance, FIGS. 11 and 12 show that the conical and cylindrical portions 100, 102 do not form complete surfaces of rotation, and are open in an upward direction. The upper parts 114, 116 of the two portions, i.e. the parts above the plinth 110, are able to flex, allowing the diameter of the cylindrical portion 102 to be slightly less than the diameter of rod 50, so that the upper parts 116 of the cylindrical portion 102 are forced apart by the rod 50, and exert a clamping restoring force on the rod, thereby holding it securely.

Flexibility of the upper parts of the conical and cylindrical portions may be increased by including small recesses in the walls of these two portions, preferably in pairs of recesses in an opposed relationship. The recesses in the conical portion are designated 118, and may be seen in FIG. 16, whereas the recesses in the cylindrical portion are designated 120 and may be seen FIGS. 12, 17 and 18.

A ramp 122 is provided in front of the retainer 34 to assist with alignment of the camera housing 44 during insertion. The ramp 122 helps ensure that the rod 50 on the camera housing 44 approaches the retainer 34 at the appropriate elevation above the baseplate 16, so that the rod 50 may enter the aperture 108. Ramp 122 therefore fulfils a similar function in connection with retainer 34 to that fulfilled by ramps 84, 86 in connection with retainers 30, 32.

Figure 14:
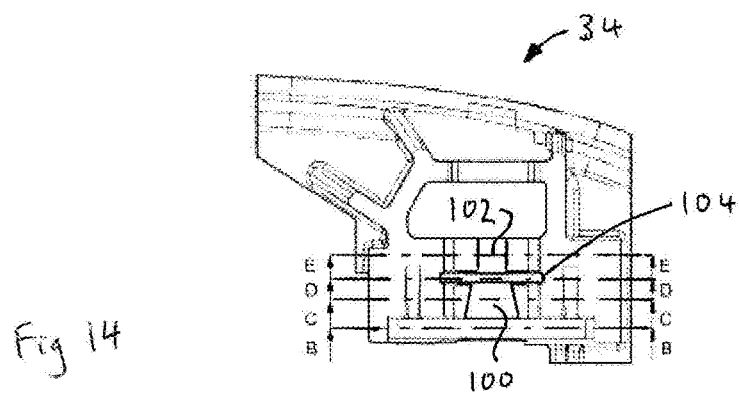
FIG. 14 is a plan view which is based on the same drawing as FIG. 10, except that it is rotated through 180°, slightly reduced in scale, and shows the lines of section B-B, C-C, D-D and E-E for FIGS. 15 to 18.

FIG. 14 is a plan view of retainer 34 which is based on the same drawing as FIG. 10, except that it is rotated through 180°, slightly reduced in scale, and shows the relative positions of the lines of section B-B, C-C, D-D and E-E for the sectional views shown in FIGS. 15 to 18. These sectional views are taken on a series of parallel planes which are at right angles to the direction of insertion I of the camera into the bracket (shown in FIG. 2). FIGS. 15 to 18 therefore show how the cross-section of the retainer 34 changes as the rod 50 enters the retainer and passes through it.

Figure 15:
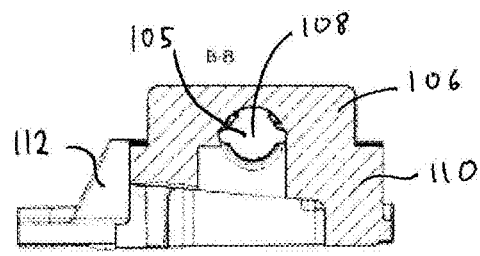
FIG. 15 is an end elevation, partly in section, of the retaining element of FIGS. 8 to 14, the section being taken on line B-B in FIG. 14.
Figure 16:
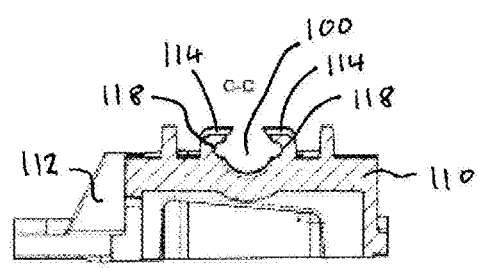
FIG. 16 is an end elevation, partly in section, of the retaining element of FIGS. 8 to 15, the section being taken on line C-C in FIG. 14.
Figure 17:
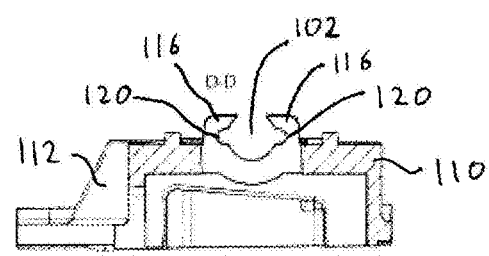
FIG. 17 is an end elevation, partly in section, of the retaining element of FIGS. 8 to 16, the section being taken on line D-D in FIG. 14.
Figure 18:
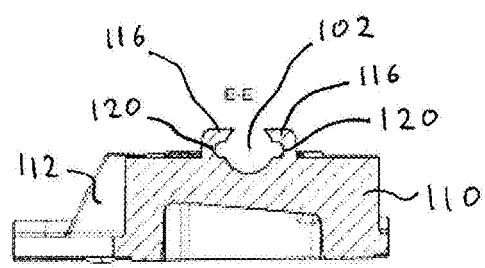
FIG. 18 is an end elevation, partly in section, of the retaining element of FIGS. 8 to 17, the section being taken on line E-E in FIG. 14.

Referring first to FIG. 15, this is a section on line B-B through the wall 106 and aperture 108. FIG. 16 shows section C-C which is taken through the conical portion 100. The upper parts 114 of the conical portion may be seen, and also the recesses 118. FIG. 17 is a section on line D-D through the slot 104, with the cylindrical portion 102 visible behind the slot. Finally, FIG. 18 shows section E-E which is taken through the cylindrical portion 102. The upper parts 116 of the cylindrical portion may be seen, and also the recesses 120 in the cylindrical portion.

The bracket described in this specification may be injection moulded by conventional moulding techniques, using tooling (i.e. moulds) manufactured according to conventional methods. Devices such as sliding and lifting cores are required to mould aspects of the retainers, but these are also within the range of moulding techniques known to the skilled person.

The invention claimed is:

1. A windscreen for a vehicle, the windscreen comprising a bracket for a sensor including a camera, the bracket being attached to the windscreen and comprising a baseplate and at least one retaining element mounted on the baseplate, wherein
    the sensor is accommodated within a sensor housing which is insertable in the bracket,
    the sensor housing has at least one rod-shaped member projecting from the sensor housing by way of which the sensor housing is retainable in the bracket in a removable manner,
    the retaining element comprises a raised bed integrated with the baseplate, the retaining element additionally comprises a resilient opposed limb, which is joined to the raised bed at one end and is free at the other end,
    the resilient opposed limb is positioned in generally opposed relationship to the raised bed, with an elongate space extending between the resilient opposed limb and the raised bed, the elongate space including one end and an other end,
    the elongate space is closed at the one end by the join between the raised bed and the resilient opposed limb, and is open at the other end so that the rod-shaped member is insertable into the elongate space when the sensor housing is inserted into the bracket and is retainable in the elongate space.

2. A windscreen as claimed in claim 1, wherein the elongate space widens towards its open other end to form a guideway for the rod-shaped member.

3. A windscreen as claimed in claim 1, wherein the raised bed comprises a recess to receive part of the at least one rod-shaped member, and the resilient opposed limb also comprises a recess to receive another part of the at least one rod-shaped member so that the recess of the raised bed and the recess of the resilient opposed limb together define a receiving space for the rod-shaped member within the elongate space.

4. A windscreen as claimed in claim 3, wherein the receiving space is in communication with adjacent spaces which are part of the elongate space, so that when the sensor housing is inserted in the bracket, the at least one rod-shaped member passes from the guideway through part of the elongate space and is received in the receiving space thereby retaining the sensor housing in the bracket.

5. A windscreen as claimed in claim 1, wherein the raised bed comprises a resilient raised tab projecting towards the closed end of the elongate space at an acute angle to the raised bed, and wherein the resilient raised tab is deformed by the rod-shaped member as it enters the elongate space, the resilient raised tab offering greater resistance to removal of the rod-shaped member than to entry thereof.

6. A windscreen as claimed in claim 1, wherein the width of the retaining element is greater than the maximum distance between the opposed limb and the raised bed.

7. A windscreen as claimed in claim 1, wherein the surfaces of the opposed limb and the raised bed which define the elongate space at its closed end, where the opposed limb and the raised bed meet, possess a minimum radius of curvature of 0.5 mm, thereby avoiding the closed end acting as a stress concentrator when the opposed limb flexes.

8. A windscreen for a vehicle, the windscreen comprising a bracket for a sensor including a camera, the bracket being attached to the windscreen and comprising a baseplate and at least one retaining element mounted on the baseplate, wherein
the sensor is accommodated within a sensor housing which is insertable in the bracket,
the sensor housing has at least one rod-shaped member projecting from the sensor housing by way of which the sensor housing is retainable in the bracket in a removable manner,
the at least one retaining element is adapted to receive the at least one rod-shaped member, and
the at least one retaining element comprises a bore having a conical portion and a cylindrical portion in communication with each other, and aligned along a common axis of rotation.

9. A windscreen as claimed in claim 8, wherein the conical portion of the bore has one end and an other end, with a smaller diameter at the one send of the conical portion of the bore, and a larger diameter at the other end of the conical portion of the bore.

10. A windscreen as claimed in claim 8, wherein either or both of the conical portion and the cylindrical portion is or are open along a curved side so that a surface of the respective portion does not form a complete 360° surface of rotation, but the surface of the respective portion requires a rotation through at least 180° to describe it.

11. A windscreen as claimed in claim 8, wherein an aperture is provided in the at least one retaining element, the aperture having an axis of rotational symmetry, and the aperture is coaxial with the conical portion and the cylindrical portion.

12. A windscreen as claimed in claim 8, wherein the conical portion and the cylindrical portion are separated by a slot oriented at right angles to the common axis of rotation.

13. A windscreen as claimed in claim 8, wherein the sensor housing is inserted into the bracket in a direction substantially parallel to the baseplate.

14. A windscreen as claimed in claim 8, wherein the bracket is made wholly of plastic.

15. A bracket for attachment to a vehicle windscreen, wherein the bracket is adapted to receive a sensor including a camera, and the bracket is in accordance with a bracket as set forth in claim 1.

16. A windscreen as claimed in claim 1, wherein the sensor housing is inserted into the bracket in a direction substantially parallel to the baseplate.

17. A windscreen as claimed in claim 1, wherein the bracket is made wholly of plastic.

18. A windscreen as claimed in claim 9, wherein the one end of the conical portion with the smaller diameter is closer to the cylindrical portion than the other end of the conical portion with the larger diameter, and the other end of the conical portion with the larger diameter is open and serves as a guideway to guide the at least one rod-shaped member into the cylindrical portion when the sensor housing is inserted in the bracket.

19. A windscreen as claimed in claim 8, wherein either or both of the conical portion and the cylindrical portion is or are open along a curved side so that a surface of the respective portion does not form a complete 360° surface of rotation, but the surface of the respective portion forms a rotation through at least 180°.

20. A windscreen as claimed in claim 11, wherein at least a tip of the at least one rod-shaped member passes through the aperture in the at least one retaining element when the sensor housing is inserted in the bracket.

* * * * *